United States Patent
Kraft et al.

(10) Patent No.: US 9,804,943 B2
(45) Date of Patent: Oct. 31, 2017

(54) ESTIMATING SERVICE RESOURCE CONSUMPTION BASED ON RESPONSE TIME

(75) Inventors: Stephan Kraft, Belfast (GB); Sergio Pacheco-Sanchez, Saltillo (MX); Giuliano Casale, Belfast (GB); Stephen Dawson, Belfast (GB)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 12/580,901

(22) Filed: Oct. 16, 2009

(65) Prior Publication Data
US 2011/0093253 A1   Apr. 21, 2011

(51) Int. Cl.
G06F 9/44      (2006.01)
G06F 13/10    (2006.01)
G06F 13/12    (2006.01)
G06F 11/34    (2006.01)

(52) U.S. Cl.
CPC ...... *G06F 11/3447* (2013.01); *G06F 11/3419* (2013.01); *G06F 11/3461* (2013.01)

(58) Field of Classification Search
CPC ............ G06F 17/5022; G06F 11/261; G06F 11/3457; G06F 11/3414; G06F 2209/5019; G06F 2209/5022; H04L 41/145; H05K 999/99
USPC ....................................................... 703/21
See application file for complete search history.

(56) References Cited

U.S. PATENT DOCUMENTS

2005/0086335 A1   4/2005 Liu et al.
2007/0168494 A1   7/2007 Liu et al.

FOREIGN PATENT DOCUMENTS

JP      2005148799 A    6/2005

OTHER PUBLICATIONS

Calzarossa et al. "A Workload Model Representative of Static and Dynamic Characteristics" Acta Informatica Springer-Verlag 1986.*
Pacific et al. "CPU Demand for Web Serving: Measurement Analysis and Dynamic Estimation", Science Direct Dec. 14, 2007.*
Z. Liu et al., "Parameter inference of queueing models for IT systems using end-to-end measurements," *Performance Evaluation, An International Journal*, vol. 63, Issue 1, Jan. 2006, pp. 36-60.
G. Pacifici et al., "CPU demand for web serving: Measurement analysis and dynamic estimation," *Performance Evaluation, An International Journal*, vol. 65, Issues 6-7, Jun. 2008, pp. 531-553.
(Continued)

*Primary Examiner* — Saif Alhija
(74) *Attorney, Agent, or Firm* — Fish & Richardson P.C.

(57) ABSTRACT

Implementations of the present disclosure provide computer-implemented methods including defining a workload comprising a plurality of service requests, each service request corresponding to a class of a plurality of classes, applying the workload to a computer system that receives and processes service requests, measuring a response time of the computer system for each request of the workload, estimating a mean service demand for each class based on the response times and a base queuing model that represents the computer system, and generating the queuing model based on the mean service demands and characteristics of the workload.

20 Claims, 13 Drawing Sheets

(56) References Cited

OTHER PUBLICATIONS

J. Rolia et al., "Parameter Estimation for Performance Models of Distributed Application Systems," Proceedings of the 1995 Conference of the Centre for Advanced Studies on Collaborative Research, IBM Centre for Advanced Studies Conference, Toronto, Ontario, Canada, 1995, 10 pages.

T. Zheng et al., "Tracking Time-Varying Parameters in Software Systems with Extended Kalman Filters," Proceedings of the 2005 Conference of the Centre for Advanced Studies on Collaborative Research, IBM Centre for Advanced Studies Conference, Toronto, Ontario, Canada, 2005, pp. 334-345.

P. Barham et al., "Using Magpie for request extraction and workload modeling," Proceedings of the Sixth USENIX Symposium on Operating Systems Design and Implementation (OSDI), Dec. 2004, pp. 259-272.

M. Bertoli et al., "Java modeling tools: an open source suite for queueing network modelling and workload analysis," Third International Conference on the Quantitative Evaluation of Systems—(QEST'06), Sep. 2006, Riverside, California, pp. 119-120.

P. Buchholz et al. "A Two-step EM algorithm for MAP fitting," *Lecture Notes in Computer Science: Computer and Information Sciences—ISCIS 2004*, vol. 3280, 2004, pp. 217-227.

G. Casale et al., "Robust Workload Estimation in Queueing Network Performance Models," Proceedings of the 16th Euromicro Conference on Parallel, Distributed and Network-Based Processing (PDP 2008), 2008, pp. 183-187.

L. Cherkasova et al., "Measuring CPU Overhead for I/O Processing in the Xen Virtual Machine Monitor," Proceedings of the Annual Conference on USENIX Annual Technical Conference, 2005, pp. 387-390.

A. Heindl, "Traffic-Based Decomposition of General Queueing Networks with Correlated Input Processes," Ph.D. Thesis, Shaker Verlag, Aachen, 2001, 189 pages.

J. Rolia et al., "Correlating Resource Demand Information with ARM Data for Application Services," Proceedings of the 1st international Workshop on Software and Performance, 1998, pp. 219-230.

Enterprise resource planning—software from SAP, Apr. 2009. http://www.sap.com/solutions/business-suite/erp/index.epx.

A. B. Sharma et al., "Automatic Request Categorization in Internet Services," *ACM Sigmetrics Performance Evaluation Review*, vol. 36, Issue 2, Sep. 2008, pp. 16-25.

Q. Zhang et al., "A Regression-based Analytic Model for Dynamic Resource Provisioning of Multi-tier Applications," Proceedings of the Fourth International Conference on Autonomic Computing, 2007, 10 pages.

S. Kraft et al., "Estimating Service Resource Consumption From Response Time Measurements," Proceedings of the Fourth International ICST Conference on Performance Evaluation Methodologies and Tools, Oct. 20-22, 2009, Pisa, Italy, pp.

Anonymous, "Queueing model", Wikipedia, Sep. 9, 2009, 4 pages.

European Search Report for Application EP10013643, dated Feb. 2, 2011, 8 pages.

First Office Action for Chinese Patent Application No. 201010509831.3, dated Dec. 23, 2013, 10 pages.

\* cited by examiner

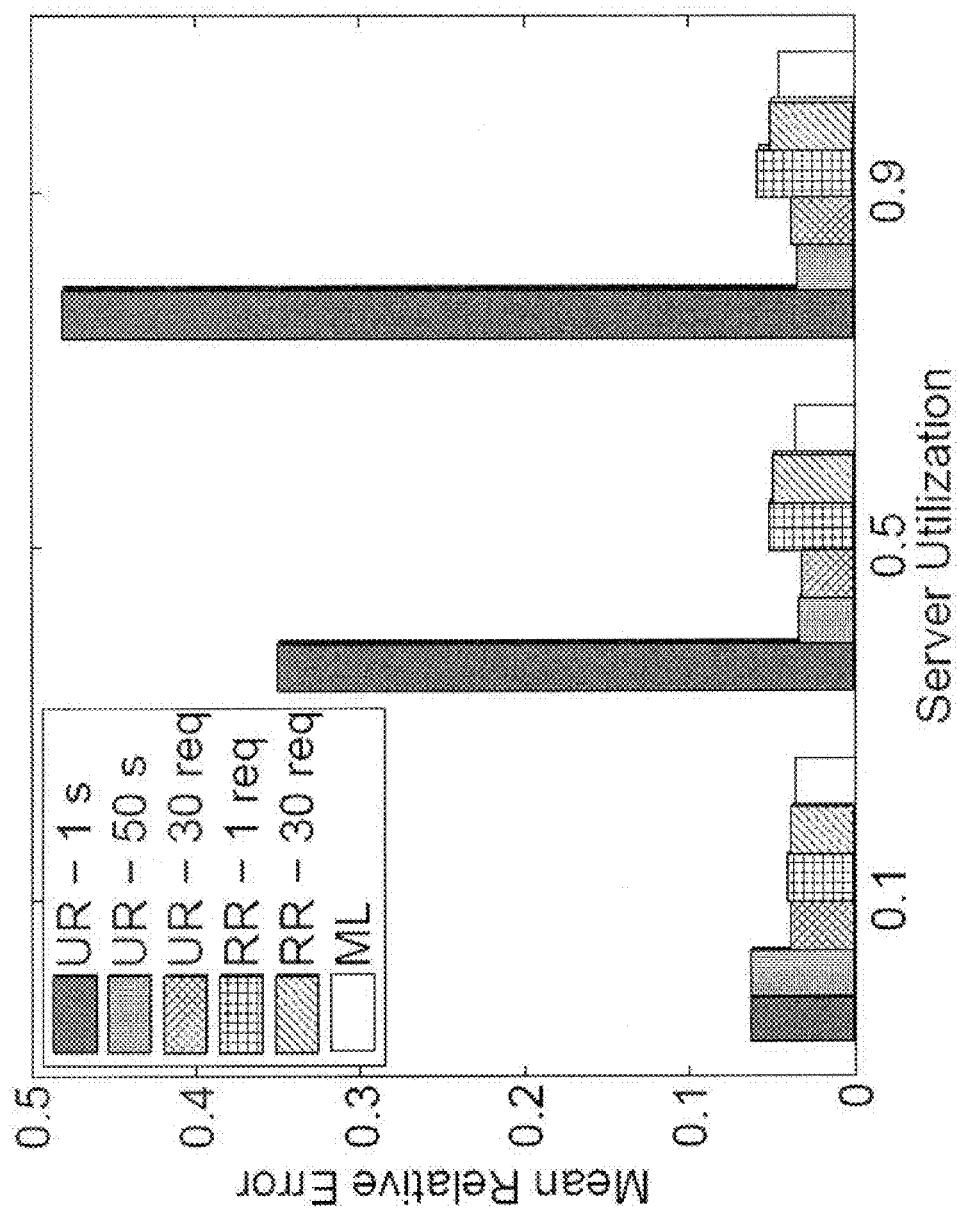

ESTIMATING SERVICE RESOURCE CONSUMPTION BASED ON RESPONSE TIME

BACKGROUND

Performance models can be implemented to predict the scalability of software and hardware systems, either by analytical methods or by simulation. More specifically, requests to software and hardware systems place demands on system resources that are employed to respond to the requests. Although modeling and evaluation techniques exist to obtain performance predictions of such systems, there are few resource consumption estimation methods that can provide good estimates of the service demands. Service demands are important parameters in specifying performance models. Consequently, the accurate estimation of service demands is desired for defining models that are both representative and robust.

Traditionally, central processor unit (CPU) utilization has been implemented to estimate service demands of software and hardware systems. The use of CPU utilization, however, suffers from several deficiencies. For example, CPU utilization measurement requires access to an operating system executed on the hardware, and also requires specialized CPU sampling instrumentation. The CPU sampling instrumentation can interfere with normal system activities and can provide inaccurate CPU utilization measurements. In some scenarios, such as in virtualized environments, accurate CPU utilization sampling is more difficult, because filtering of hypervisor overheads is required, for example. In other scenarios, to be modeled systems are owned by third parties, such as web service providers, which do not provide CPU utilization data for their servers.

SUMMARY

Implementations of the present disclosure provide computer-implemented methods for generating a queuing model of a computer system. In some implementations, the method includes defining a workload comprising a plurality of service requests, each service request corresponding to a class of a plurality of classes, applying the workload to a computer system that receives and processes service requests, measuring a response time of the computer system for each request of the workload, estimating a mean service demand for each class based on the response times and a base queuing model that represents the computer system, and generating the queuing model based on the mean service demands and characteristics of the workload. Characteristics of the workload can include, but are not limited to, an inter-arrival time distribution of requests arriving into the queue such as exponential inter-arrival times having mean of 5 requests per second.

In some implementations, the method further includes determining a plurality of arrival queue-lengths corresponding to each request of the workload, wherein estimating a mean service demand is further based on the plurality of arrival queue-lengths. Each arrival queue-length of the plurality of arrival queue-lengths can be determined from log files that report a time of arrival and departure of requests.

In some implementations, the method further includes determining a plurality of residual times corresponding to each request of the workload, wherein estimating a mean service demand is further based on the plurality of residual times. Each residual time can correspond to a time remaining to complete processing of an in-process request upon arrival of a to-be-processed request.

In some implementations, estimating a mean service demand includes estimating mean service demands in the base queuing model using one of linear regression and maximum likelihood method analyses based on the measured response times.

In some implementations, generating the queuing model includes parameterizing the base queuing model using the mean service demands.

In some implementations, the base queuing model includes assumptions on characteristics of the queuing model, the characteristics comprising at least one of scheduling and a service demand distribution.

In some implementations, the computer system includes an application server that executes an application, and one or more client systems that generate the requests.

In some implementations, the method further includes evaluating a performance of a computer system by processing the queuing model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes a computer system that receives and processes service requests, one or more processors, and a computer-readable storage medium coupled to the one or more processors and having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 7A-7C are graphs illustrating exemplar mean relative errors at different server utilization levels.

Like reference symbols in the various drawings indicate like elements.

DETAILED DESCRIPTION

Figure 1:
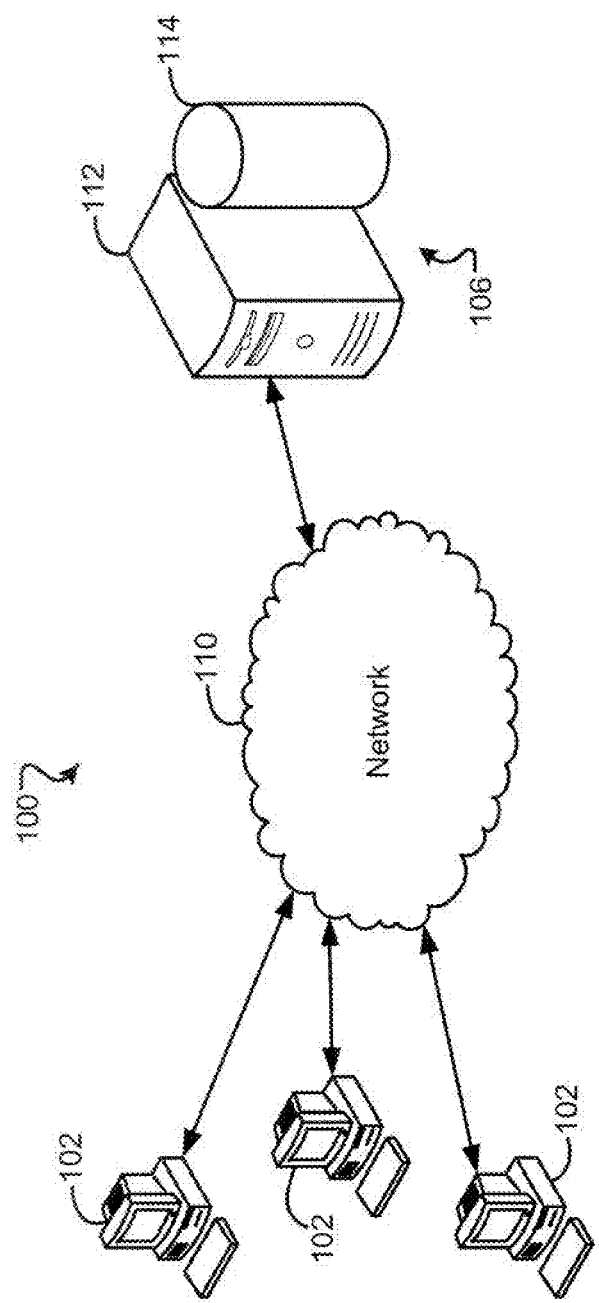
FIG. 1 is a schematic illustration of an exemplar system architecture in accordance with implementations of the present disclosure.

With particular reference to FIG. 1, an exemplar system 100 is illustrated. The exemplar system 100 of FIG. 1 can be provided as an enterprise resource planning (ERP) system including a plurality of client computers 102 that communicate with one or more back-end server systems 106 over a network 110. The network can be provided as a large computer network, such as a local area network (LAN), wide area network (WAN), the Internet, a cellular network, or a combination thereof connecting any number of mobile clients and servers. In some implementations, the clients 102 may be directly connected to the server system 106 (without connecting through the network, for example).

The client computers 102 represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The server system 106 includes an application server 112 and a database 114, and is intended to represent various forms of servers including, but not limited to a web server, an application server, a proxy server, a network server, and/or a server farm. In general, the server system 106 accepts user requests for application services and provides such services to any number of client devices 102 over the network 110. In some implementations, the server system 106 can provide a central point through which service-providers can manage and access data related to web services.

In operation, multiple clients 102 can communicate with server system 106 through the network 110. In order to run an application, such as a browser-based application, for example, each client 102 can establish a corresponding session with the server system 106. Each session can involve two-way information exchange between the server system 106 and each individual client 102. This two-way information exchange can include requests generated at the client 102 that are communicated to the server system 106. The server system 106 receives the requests, queues multiple requests, executes processes based on the requests, and provides a response to the requesting client 102.

Implementations of the present disclosure are directed to the accurate estimation of service demands on computer software and hardware systems, such as the system 100 discussed above with reference to FIG. 1. Although ERP systems are used to illustrate implementations of the present disclosure, applicability of the present disclosure is not limited to ERP systems. More specifically, the present disclosure is applicable to any computer software and hardware system including, but not limited to any type of multi-tier program application, modeling of hardware (e.g., a disk drive, or memory), and/or network links.

Implementation of the present disclosure provide estimation methods that use measured response times of requests to estimate service demands for a multi-class workload. The response time is provided as the end-to-end time for completing a request, and includes both the service time (e.g., the time the request is being attended to or service) and delays due to resource contention (e.g., waiting time due to buffering). The workload (i.e., a body of requests) can include several classes (i.e., transactions types). Implementations of the present disclosure address the estimation of service time, also referred to as service demand, for each class based on response time measurements.

By way of non-limiting example, a real-world industrial ERP application is used to illustrate implementations of the present disclosure showing that the disclosed response time based approach results in improved performance predictions. The response time based approach of the present disclosure is more widely applicable, because response times are often directly logged by executing applications, and/or can be obtained by an external observer. Furthermore, response times may be easily available for systems that are owned by third parties, such as web service providers, which do not publicly expose utilization data for their servers.

The service demand estimation methods of the present disclosure can be implemented with, but are not limited to, systems with first-come first-served (FCFS) scheduling, and are based on linear regression and maximum likelihood estimation approaches. The response time based linear regression uses exact equations that relate the mean response time of requests to a queue length seen on arrival of a request to the system, both of which can be easily obtained from application logs. The maximum likelihood approach considers the entire distribution of the measured response times, and can achieve increased estimation accuracy. Using phase-type distributions, the present disclosure provides a computational method to evaluate likelihood values and to estimate resource consumption.

This information is used to parameterize a queuing model that models the underlying system. As used herein, parameterizing includes a process of determining and defining the parameters necessary for a complete or relevant specification of a model, a queuing model in the present case. A queuing model is a model that approximates a real queuing system so the queuing behavior can be analyzed using steady-state performance measures. Queuing models can be represented using Kendall's notation which is provided as: A/B/S/K/N/Disc; where A is the inter-arrival time distribution, B is the service time distribution, S is the number of servers, for example, K is the system capacity, N is the calling population, and Disc is the service discipline assumed. In some instances, K, N and Disc are omitted, so the notation becomes A/B/S. Standard notation for distributions A and/or B include M for a Markovian (exponential) distribution, $E_\kappa$ for an Erlang distribution with $\kappa$ phases, D for Degenerate (or Deterministic) distribution (constant), G for General distribution (arbitrary), and PH for a Phase-type distribution.

Numerical results, discussed in further detail below, illustrate the improved accuracy of the response time based approach as compared to utilization based approaches. Furthermore, an intrinsic advantage of the response time based approach of the present disclosure is that response times at a server depend on all of the latency degradations incurred by requests within the system. Consequently, the response times are inherently more comprehensive descriptors of performance, because the response times account for bandwidth, memory, and input/output (I/O) contention delays. The response time based approach of the present disclosure readily accounts for these delays, which are otherwise ignored by traditional approaches.

Figure 2:
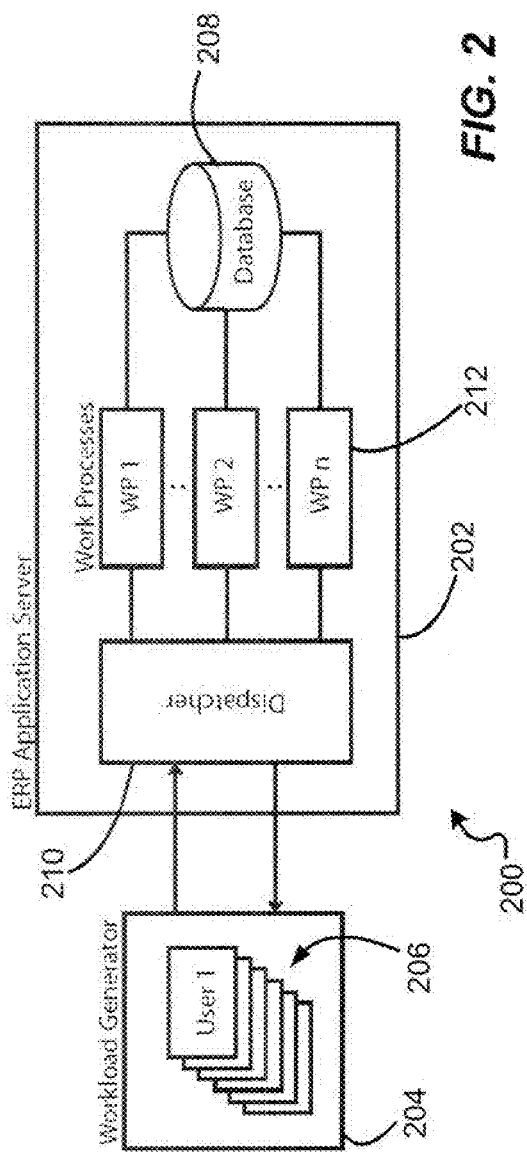
FIG. 2 is a functional block diagram of an exemplar enterprise resource planning (ERP) system.

Referring now to FIG. 2, a simplified, exemplar application server system 200 is illustrated. The simplified architecture of FIG. 2 is presented as a non-limiting example that is used to illustrate implementations of the present. The system 200 includes an application server system 202 and a workload generator 204. The workload generator 204 functions as a plurality of client devices (e.g., clients 102) that transmit requests to the application server system 202, placing service demands on resources of the application server system 202. The system 200 can include an ERP application of one or more application programs, such as those included in the SAP Business Suite, provided by SAP AG of Walldorf, Germany. The exemplar system 200 of FIG. 2 is provided in a two-tier configuration and includes an application server and a database server installed on a common virtual machine. In the example of FIG. 2, and for purposes of the present illustration, no other virtual machines run on the physical machine. It is appreciated, however, that the present disclosure is not limited to such arrangements.

The system 200 is stress-tested using a workload of operations (e.g., sales and distribution), which can include, but are not limited to standard business transactions (e.g., the creation and/or listing of sales orders and invoices). The workload generator 204 can be of a closed-type where requests are issued by a fixed group of N users 206. Upon the completion of a request submitted by a user, an exponentially-distributed think time (e.g., with mean time Z equal to 10 s) expires before submitting a new request to the system. All users 206 can cyclically submit the same sequence of requests to the ERP application. After submission of the requests, the application server processes the requests from the multiple, concurrent users 206. This processing can be achieved using information extracted from a database 208. The application server uses a dispatcher 210 that buffers the requests in a queue and transfers the requests to work processes 212. The work processes 212 can be provided as independent operating system threads serving the requests in parallel. The work processes 212 can be executed as either dialog processes, which execute interactive programs, or update processes, which perform database changes.

Figure 3:
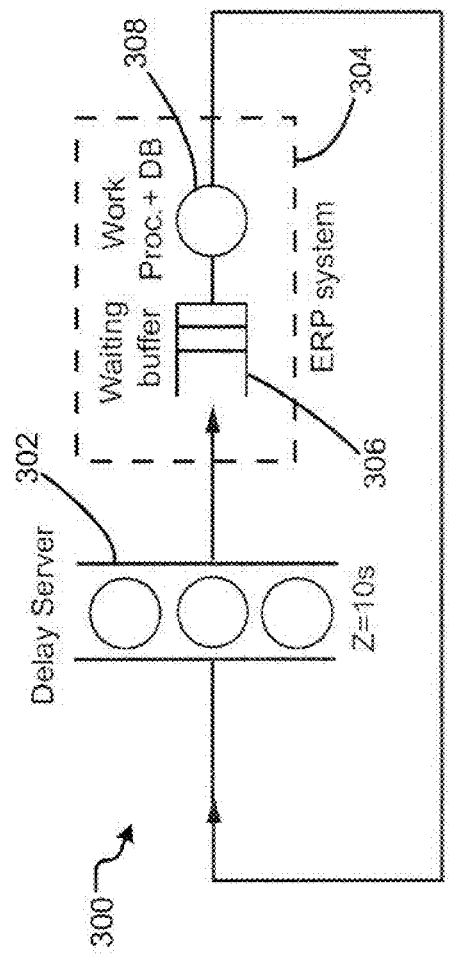
FIG. 3 is a functional block diagram of an exemplar queuing model corresponding to an exemplar ERP application.

The parameterization of a basic queuing model that describes the performance of an ERP application (e.g., of FIG. 2) can be significantly improved if the measured response times ($R_{MEAS}$) are used to estimate resource consumption of requests. The performance model considered for this task includes, but is not limited to, a basic M/M/1//N model 300, an exemplar structure of which is illustrated in FIG. 3. The exemplar model 300 of FIG. 3 includes a delay server 302 and an ERP system 304 that includes a waiting buffer 306 and a work processes and database system 308. The M/M/1//N model 300 is an M/M/1 queue with requests generated by a finite population of N users. This can also be seen as a closed queuing network composed of a delay station, which models user think times, followed by a queuing station on a closed-loop. The waiting buffer 306 represents an admission control in the ERP system 304, and the server models the resource consumption of the requests when executed in the work process.

It is common that the utilization of the database server is less than 5%. Consequently, queuing effects at the database tier are negligible and the total time to provision data from the database ($T_{MEAS}^{DB}$) can be used as a component of the service demand in the work process. Both think times and service demands in the queuing model can be assumed to be exponentially distributed. This assumption has been verified as a good approximation of actual service demand distribution in an ERP system. The coefficient of variation (CV) of the measured service demands (i.e., the ratio between standard deviation and mean) ranges over different validations in CV=[1:02; 1:35], whereas for the theoretical exponential is CV=1. Consistently with the model assumptions, all think times for validations have been generated using an exponential distribution as well.

When parameterizing a queuing model, a base queuing model is initially determined. The base queuing model is a stochastic model that represents the arrival and departure of requests from resources of the computer system (e.g., CPU). The base queuing model is provided as an abstraction of the analyst in order to capture the phenomena that affect performance of requests served by the resource modeled. Characteristics that are defined for such a queuing model to describe the computer system include the resource scheduling disciplines and their service time distributions, as well as interconnections with other resources and/or the statistical characteristics of request arrivals at each resource. Based on this information, the base queuing model can be provided using standard Markov chain theory, for example. A final or target queuing model can be subsequently parameterized based on estimated mean service demands that can be determined by processing the base queuing model and measured response times. The estimation of the mean service demand provided in the present disclosure enables the parameterization of the service time distribution for one or more resources modeled in the base queuing model.

The mean service demand (E[D]) of the requests at the server is determined such that the response times predicted by the model accurately match accurately the measured response times ($R_{MEAS}$) of the real system for all possible numbers of users N. Due to the large role of caching, which affects the behavior of the ERP system very differently at light and heavy loads, the service demands are specified as a function of the number of users N in the model, (i.e., E[D]≡E[D](N)). This estimation approach is routinely used in modeling complex software systems.

Figure 4:
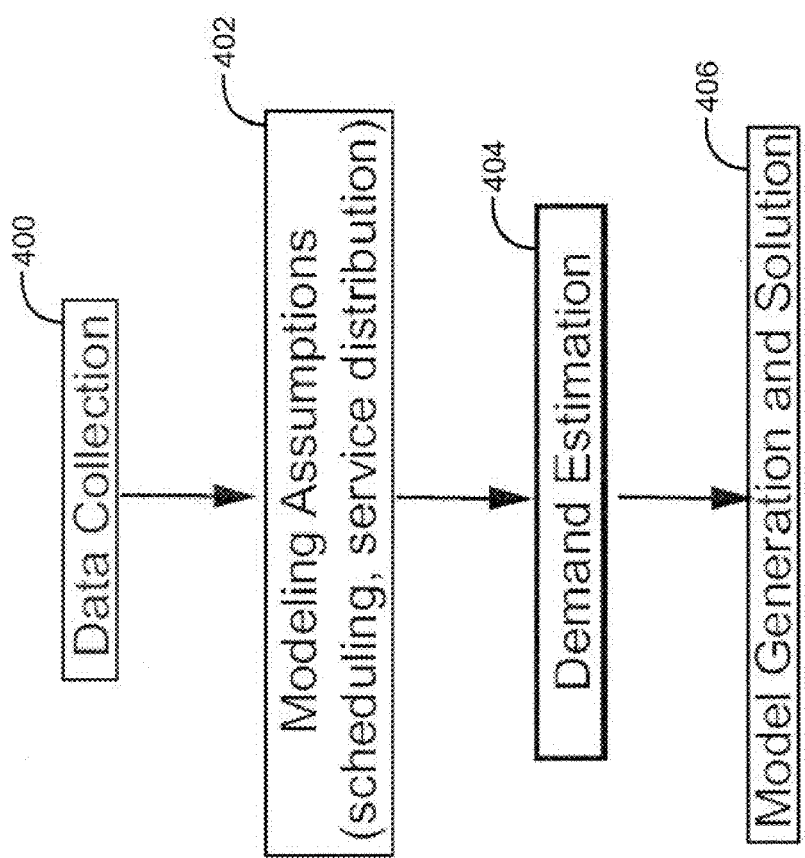
FIG. 4 summarizes a response time based approach in accordance with implementations of the present disclosure.

Referring now to FIG. 4, the present disclosure provides direct parameterization of queuing models based on the response time measurements ($R_{MEAS}$). More specifically, service demands are estimated to best match the distribution or moments of the measured response times. This requires an important paradigm shift in the modeling methodology as illustrated in FIG. 4. The modeling methodology of FIG. 4 includes data collection 400, modeling assumptions (e.g., scheduling and service distribution) 402, demand estimation 402, and model generation and solution 406. A solution of the model can be provided by values for the mean response times, the mean throughput, and the probability of observing a certain number of requests in the queue at a random instant.

Because the response times depend on several system properties related to scheduling or service demand distribution, assumptions on scheduling or general form of the distribution are taken prior to starting the service demand estimation activity. The assumptions can include, but are not limited to, the type of scheduling (e.g., FCFS scheduling), the number of workload classes to be modeled, and the distribution of the service demands of each request (e.g., exponential distribution). Consequently, the returned service demands depend on the characteristics of the model in which they will be used. Preliminary assumptions on the characteristics of the final model are provided to determine the best possible service demand estimates relative to the target model. Because the goal of the modeling activity is to obtain good agreement between experimental observations and model predictions, the response time based approach of the present disclosure has a stronger focus on achieving this goal by returning the best parameters under model assumptions.

As discussed above, the illustrative ERP system can be modeled as a FCFS queue with exponentially distributed service demands. For example, an exponential distribution can describe the times between events in a process in which events occur continuously and independently at a constant average rate. Under these assumption, a request that finds the system with n waiting requests and one request in service receives a response time distribution given by the distribution of the sum of random variables, provided as:

$$R = T + D^1 + D^2 + \ldots + D^n + D^{n+1} \quad (1)$$

where T is the residual time before completion of the request in service, $D^i$ for $1 \leq i \leq n$ is the service demand of the ith queued request, and $D^{n+1}$ is the service demand of the newly arrived request. Note that, by definition of exponential distribution, T is equal to D and thus the distribution of the random variable R is the convolution of n+1 exponential random variables.

Figure 5:
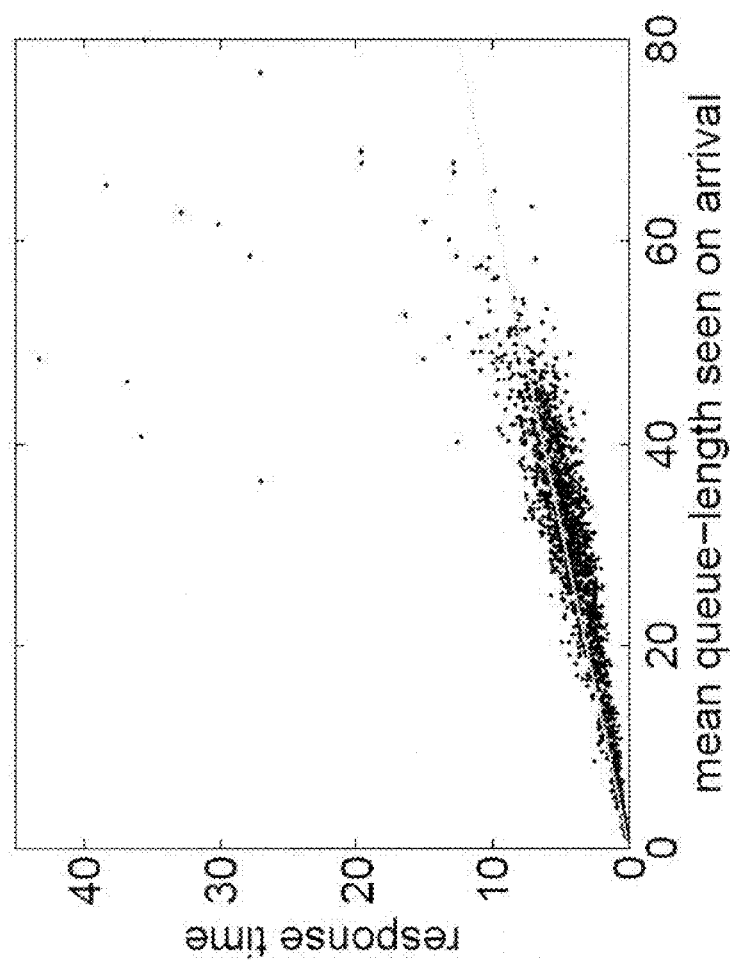
FIG. 5 is a graph illustrating a linear relation between measured response times and measured queue-lengths.

By simple derivations it can be shown that the mean response time is found to satisfy the following relation:

$$E[R] = E[D](1 + E[A]) \quad (2)$$

where E[D] is the mean service demand and E[A] is the mean queue length observed by a request upon time of arrival. Equation 2 can be used to estimate the mean service demand of the requests given the knowledge of the mean number of requests in the ERP system at the time of arrival of a new request. The value A can be obtained from the log files of experiments that have been performed, which report the time of arrival and departure of requests. An estimate of E[D] ($D_{EST}^{RSP}$) can be obtained by linear regression of Equation 2 using a sequence of samples of E[R] and E[A] obtained by averaging $R_{MEAS}$ and the measured A values for groups of X consecutive requests (e.g., X=20). An exemplar graphical illustration of a measured linear relation between E[R] and E[A] in an ERP system is provided in FIG. 5.

From Equation 2, E[D] can be evaluated by linear regression as:

$$E[R_{MEAS}^i] = E[D](1 + E[A_{MEAS}^i]) \quad (3)$$

where the index i stands for the ith value collected in the measurement activity and $E[D_{MEAS}^i]$ and $E[A_{MEAS}^i]$ are the response time and arrival queue-length, respectively, averaged on X consecutive i samples (e.g., X=20).

Using the above-described equations as a basis, the present disclosure provides service demand estimation algorithms for multi-class requests based on linear regression and maximum likelihood techniques, each of which is described in further detail herein using an exemplar queuing scenario. Solely for purposes of exemplar illustration, it is assumed that a user has provided an input trace with a total of I samples to the service demand estimation algorithms. This can include, but is not limited to a sequence of measured response times ($R_c$) for requests of class c, and the corresponding queue-length ($A_k^c$) of class-k requests seen upon arrival by each class c request. The number of workload classes is denoted by K.

In one implementation, the linear relation given in Equation 3 does not change if the assumptions on exponential service are dropped, or multiple classes are considered. Accordingly, a variant of the expression developed for approximating FCFS queues in non-product-form queuing networks with multiple classes can be provided as:

$$E[R_c] = E[T_c] + \sum_{k=1}^{k} E[D_k](1_{k,c} + E[A_k^c]) \quad (4)$$

where $1_{k,c}$ is equal to 1 when k=c and is equal to 0 when k≠c. $T_c$ is the residual time before completion of the request in execution at the instant of arrival of the class c request, K is the number of request classes, E[Dk] is the mean service demand of class k, and $E[A_k^c]$ is the mean number of requests of class k queuing in the system excluding both the newly arrived request and the request currently in service.

Equation 4 can provide the mean request time of a request of class c in a GI/GI/1/FCFS queue, for example. GI indicates general independent distribution, which is a specific type of general distribution where requests are independent of each other. In the exemplar case of a GI/GI/1 queue with FCFS scheduling, the random variable describing the response time of a request of class c arriving when the system has n+1 queued requests (i.e., n requests waiting plus the request in service) is provided as:

$$R_c = T_c + D^1 + D^2 + \ldots + D^n + D_c \quad (5)$$

where $T_c$ is the residual time before completion of the current request in service, $D^i$ for $1 \leq i \leq n$ is the service demand of the ith queued request, and $D_c$ is the service demand of the newly arrived request.

Taking expectations conditioned on the arrival queue-length being $A^c = n$ provides:

$$E[R_c | A^c = n] = E[T_c | A^c = n] + \sum_{i=1}^{n} E[D^i | A^c = n] + E[D_c] \quad (6)$$

where C(i) is the class of the request in position i ($1 \leq i \leq n$).

The service demands as a function of the request class can be expressed as:

$$E[D^i | A^c = n] = \sum_{k=1}^{K} E[D_k] P[C(i) = k | A^c = n] \quad (7)$$

Substituting Equation 7 into Equation 6 provides:

$$E[R_c | A^c = n] = E[T_c | A^c = n] + \sum_{i=1}^{n} \sum_{k=1}^{K} P[C(i) = k | A^c = n] E[D_k] \quad (8)$$

The mean response time can subsequently be determined based on:

$$E[R_c] = \sum_{n=1}^{+\infty} E[R_c \mid A^c = n] P[A^c = n] \qquad (9)$$

$$= E[T_c] + \sum_{k=1}^{K} E[D_k] \sum_{n=1}^{+\infty}$$

$$\left( 1_{k,c} + \sum_{i=1}^{n} P[C(i) = k \mid A^c = n] P[A^c = n] \right)$$

$$= E[T_c] + \sum_{k=1}^{K} E[D_k]$$

$$\left( 1_{k,c} + \sum_{n=1}^{+\infty} E[A_k^c \mid A^c = n] P[A^c = n] \right)$$

$$= E[T_c] + \sum_{k=1}^{K} E[D_k](1_{k,c} + E[A_k^c]),$$

where $$\sum_{i=1}^{n} P[C(i) = k \mid A^c = n]$$

is the mean number $E[A_k^c \mid A^c = n]$ of class k requests waiting in the queue upon arrival by a request of class c.

Estimates of the class demands $E[D_k]$ can be obtained from Equation 4 using regression methods such as the non-negative least-squares algorithm (e.g., the lsqnonneg provided in MATLAB by The Mathworks, Inc.) and confidence intervals on the estimates can be generated using standard formulas. Equation 4 can be used in linear regression for estimating the mean service demands $E[D_k]$, if the per-class response times $R_c$ and the arrival queue-lengths $A_c$ are known. In general, $E[T_c]$ can be difficult to directly measure. Consequently, approximations are needed to estimate this quantity. To achieve this, approximation schemes can be implemented, which can include, but are not limited to the standard Poisson arrival approximation $T_c = D_k$.

Due to the lack of exact results for the residual time expression ($T_c$) in the exemplar GI/GI/1/FCFS queues, the following renewal-theory expression for the residual time is used:

$$E[T_c] = \frac{E[D_c]}{2}(1 + CV_c^2) \qquad (10)$$

where $CV_c$ is the coefficient of variation of the service demand distribution of class c. This is clearly an approximation in GI/GI/1/FCFS queues, which becomes an exact expression when the arrival stream is a Poisson process. If the $CV_c$ value is not known a priori, it is still possible to evaluate Equation 4 for different $CV_c$ values that are assumed feasible for the system under study. The set that produces the minimum mean residual error in the least-squares solution of Equation 4, which is thus the group of coefficient of variations that best fits the observations, is selected as the best estimate of the $CV_c$ values. This outlines a general schema for possible application of Equation 4 to non-exponential service distributions.

In some implementations, maximum likelihood estimation can be used for inferring statistics of random variables based on analytical expressions of the probability of observing a certain sample path. Within the scope of mean service demand estimation, maximum likelihood can be formulated by letting $R^i$ denote the ith observed, or measured response time, for all $1 \leq i \leq I$, where I is the total number of measured response times. The mean service demand $E[D_k]$ for each class $1 \leq k \leq K$ is sought, such that the probability of observing the sequence of measured response times $R^1, \ldots, R^i, \ldots, R^I$ is maximal. Formally, this can be expressed as finding the set of mean service demands $E[D_1], \ldots, E[D_K]$. This solves the following maximization problem:

$$\max_{E[D_1],\ldots,E[D_k]} P[R^1, \ldots, R^i, \ldots, R^I \mid E[D_1], \ldots, E[D_K]] \qquad (11)$$

subject to $E[D_k] \leq 0$, for all classes k. Assuming the response time as independent random variables, the joint probability expression in Equation 11 is simplified into the product:

$$\max_{E[D_1],\ldots,E[D_k]} \prod_{i=1}^{I} P[R^i \mid E[D_1], \ldots, E[D_K]] \qquad (12)$$

and taking the logarithm to equivalently express the products as a summation provides:

$$\max_{E[D_1],\ldots,E[D_k]} L(E[D_1], \ldots E[D_K]) \qquad (13)$$

where the argument is now the likelihood function provided as:

$$L(E[D_1], \ldots E[D_K]) = \sum_{i=1}^{I} \log P[R^i \mid E[D_1], \ldots E[D_K]] \qquad (14)$$

The challenge is to obtain an expression for the likelihood function that is representative of the problem under study, and for which the maximum can be computed efficiently. It is also important that this expression is analytically tractable, since optimization can be otherwise too expensive. In particular, the focus here is on the estimation of the mean service demand, because this is a significant parameter for the specification of standard capacity planning models based on product-form queuing models.

In some implementations, one method for deriving the likelihood function characterizes both the service and response times of the subject system by phase-type distributions, which enjoy efficient analytical expressions for their evaluation. To avoid unnecessary complexity, an approach for the case of exponentially-distributed service demands is set forth, and an extension of this to the case of general service demands is provided.

For example, a request that arrives to the system when $n_1, \ldots, n_K$ requests are queued for each class, including the request currently in service, is considered. Exponential service demands can be assumed for all classes, and the mean service rate of class k is denote by $\mu_k = 1/E[D_k]$. The distribution of response times for the kth request is given by the sum of $n_1$ exponential service demands with rate $\mu_1$, $n_2$ exponential service demands with rate $\mu_2$, and so forth for all K classes. Consequently, this can be modeled as the time to absorption in a Markov chain with $n = n_1 + \ldots + n_K$ states, each one representing the waiting time due to a request service. By way of non-limiting example, if there are K=2 classes and the queue seen on arrival is $n_1 = 3$ and $n_2 = 2$, including both the arrived request and the one in service, the time to absorption can be provided by the phase-type distribution with the following $(D_0, D_1)$ representation:

$$D_0 = \begin{bmatrix} -\mu_1 & \mu_1 & 0 & 0 & 0 \\ 0 & -\mu_1 & \mu_1 & 0 & 0 \\ 0 & 0 & -\mu_1 & \mu_1 & 0 \\ 0 & 0 & 0 & -\mu_2 & \mu_2 \\ 0 & 0 & 0 & 0 & -\mu_2 \end{bmatrix} \quad (15)$$

$$D_1 = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ \mu_2 & 0 & 0 & 0 & 0 \end{bmatrix} \quad (16)$$

The $D_0$ matrix has off-diagonal elements in position (i, j) representing a transition from state i to state j that does not lead to absorption, while $D_1$ elements are transitions associated to absorption. The diagonal of $D_0$ is such that $D_0$ plus $D_1$ is an infinitesimal generator of a Markov chain describing the evolution of the active state over time.

The $(D_0, D_1)$ representation enables the probability that a request receives a response time $R^i$ to be efficiently determined. The time to absorption is described by the probability density of the phase-type distribution $(D_0, D_1)$. From the basic theory of absorbing Markov chains this is readily provided as:

$$P[R^i|E[D_1], \ldots, E[D_k]] = \vec{\pi}_e e^{D_0 R^i} (D_1) \vec{e} \quad (17)$$

where $\vec{e} = (1, 1, \ldots, 1)^T$, $\vec{\pi}_e = \vec{\pi}_e(-D_0)^{-1}D_1$ is a row vector with elements $(\vec{\pi}_e)_j$ representing the initial state of a request immediately after absorption, and knowledge of $E[D_1], \ldots, E[D_k]$ is equivalent to knowing the rates $\mu_1, \ldots, \mu_K$. Because there is a single transition in $D_1$ leading to absorption, it is immediately concluded that, in Equation 17, it is always it, $\vec{\pi}_e = (1, 0, \ldots, 0)$ and the main cost of evaluating Equation 17 is the computation of the matrix exponential function. This can be approximated in an efficient manner using a uniformization technique, or by Padé expansion (e.g., provided in MATLAB). The above-described approach can be generalized to non-exponential service demands that can be approximated as phase-type.

This concept can be illustrated by letting $(S_0^k, S_1^k)$ denote the phase-type representation of the service demands of class k. By way of non-limiting example, for the Erlang-2 distribution, this is provided as:

$$S_0^k = \begin{bmatrix} -\mu_k & \mu_k \\ 0 & -\mu_k \end{bmatrix};$$

and $$S_1^k = \begin{bmatrix} 0 & 0 \\ \mu_k & 0 \end{bmatrix}.$$

which implies a probability vector $\vec{\pi}_e^k = (1, 0)$.

For the same example of the exponential case, and if the service is distributed using the exemplar Erlang-2 distribution, the response time spent in the queue can be expressed as:

$$D_0 = \begin{bmatrix} -S_0^1 & S_1^1 & 0 & 0 & 0 \\ 0 & -S_0^1 & S_1^1 & 0 & 0 \\ 0 & 0 & -S_0^1 & S_1^1 \vec{e}\vec{\pi}_e^2 & 0 \\ 0 & 0 & 0 & -S_0^2 & S_1^2 \\ 0 & 0 & 0 & 0 & -S_0^2 \end{bmatrix} \quad (18)$$

$$D_1 = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ S_1^2 \vec{e}\vec{\pi}_e^1 & 0 & 0 & 0 & 0 \end{bmatrix} \quad (19)$$

where $\vec{\pi}_e^k = \vec{\pi}_e^k(-S_0^k)^{-1}S_1^k$. The $\vec{e}\vec{\pi}_e^k$ terms ensure proper initialization of the phase-type distribution, because, in general, the state space sizes of $(S_0^1, S_1^1)$ and $(S_0^2, S_1^2)$ are different. The above-described expression can be immediately evaluated for computing the likelihood function using Equation 17. The only difference is that this involves larger matrices.

For service demand distributions specified by several parameters, such as the hyper-exponential distribution, the above-described approach requires either all moments be fixed except the mean a priori (e.g., by guessing the variability of the service process), or to integrate these additional parameters as unknown variables in the maximum likelihood processing. This changes the structure of the maximum likelihood estimation problem to evaluating conditional probabilities in the form of:

$$\log P[R^i|E[D_k], E[D_k^2], \ldots, E[D_k^M], 1 \leq k \leq K] \quad (20)$$

if the phase-type distributions are uniquely specified by their first M moments $E[D_k^M]$, $1 \leq m \leq M$. For example, the hyper-exponential distribution can be fully determined by three parameters. Consequently, the first three moments $E[D_k^M]$ are sufficient to completely specify the distribution.

In the presence of high-variability distributions, which are the most challenging to address, it is more practical to decompose the workload in an increased number of classes. In this manner, the service distribution of each class can be approximated by an exponential. For example, if a workload class has hyper-exponential service demands with density $f(t) = p\mu_1 e^{-\mu_1 t} + (1-p)\mu_2 e^{-\mu_2 t}$, and arrival rate $\lambda$, then the workload can be approximated by two classes with exponential service demands $f_1(t) = \mu_1 e^{-\mu_1 t}$ and $f_2(t) = \mu_2 e^{-\mu_2 t}$, and arrival rates $\lambda_1 = p\lambda$ and $\lambda_2 = (1-p)\lambda$, respectively. This enables the focus to be on the mean service demand estimation under simpler exponential assumptions. Accordingly, a point of interest of the service demand analysis is to be able to reliably estimate exponentially-distributed service demands in a multi-class setting.

Figure 6B:
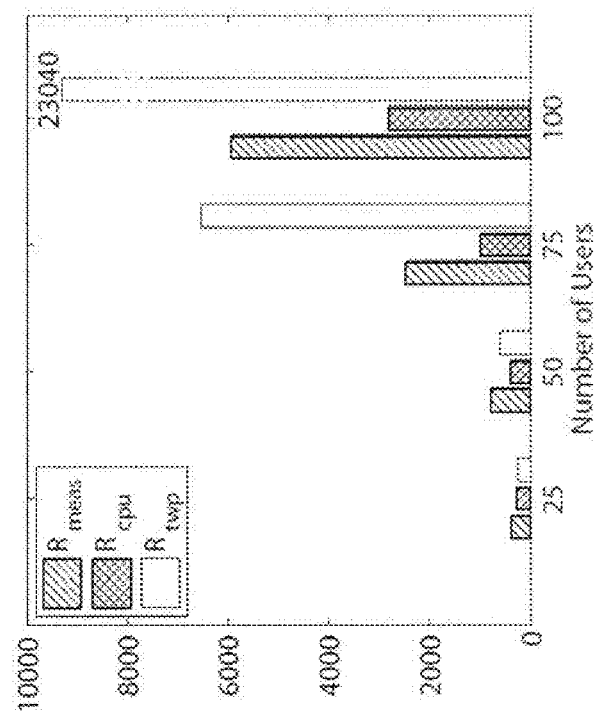
FIGS. 6A and 6B are graphs illustrating a comparison of response time predictions based on a response time approach in accordance with implementations of the present disclosure, and a traditional utilization based approach, respectively.
Figure 6A:
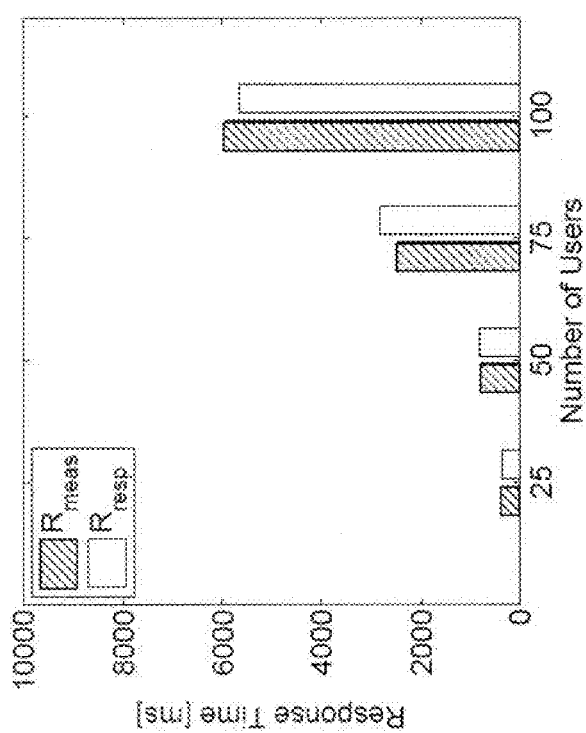

Referring now to FIGS. 6A and 6B, the accuracy of the response time based approach is highlighted as compared to a traditional CPU utilization based approach. FIG. 6A provides estimates and model prediction accuracy results for the exemplar M/M/1//N queuing models parameterized respectively using the response time based approach of the present disclosure. FIG. 6B provides estimates and model prediction accuracy results for the exemplar M/M/1//N queuing models parameterized respectively using the CPU utilization based approach. FIG. 6B illustrates that the model parameterized in accordance with a CPU utilization based approach provides a response time estimate ($E_{CPU}$) that grossly underestimates the measured response time ($R_{MEAS}$)

of the underlying ERP system. In this case, $R_{CPU}$ values are determined based on the exemplar queuing model being parameterized with E[D] being equal to $D_{EST}^{CPU}$, which is determined by linear regression of the sum of the total CPU consumption of each request ($T_{MEAS}^{CPU}$) and the total time to provision data from the database ($T_{MEAS}^{DB}$) against the number of completed requests.

FIG. 6B also illustrates that the model parameterized in accordance with a CPU utilization based approach provides a response time estimate ($R_{TWP}$) that grossly overestimates the measured response time ($R_{MEAS}$) of the underlying ERP system. In this case, $R_{TWP}$ values are determined based on the exemplar queuing model being parameterized with E[D] being equal to $D_{EST}^{TWP}$, which is determined by linear regression of the total time spent in the work process ($T_{MEAS}^{TWP}$) against the number of completed requests. As seen in FIG. 6A, the response time based approach of the present disclosure is more effective in producing high-quality predictions, as compared to the utilization based service demand estimation considered in FIG. 6B.

The accuracy of the response time based service demand estimation in accordance with the present disclosure can also be illustrated with reference to utilization and response time traces generated by a queuing system simulator using simulation periods of 60, 600 and 3600 seconds, for example. Such a simulator can been written using a numerical computing environment and programming language (e.g., MATLAB provided by The Mathworks, Inc.) and can programmed to log standard performance measures, as well as the queue-length seen upon arrival by requests. Inter-arrival times and mean service demands can be generated from exponential distributions and their means are assigned to match utilization levels that are fixed for the simulations:

The simulations are based on system utilization and response time measurements over an exemplar period of 600 seconds, and have been run with low, medium and high server utilization levels (e.g., $\rho \in \{0.1, 0.5, 0.9\}$), as well as with request classes $K \in \{1, 2, 5\}$. Response time measurements can be collected on a per-request basis, while utilization is sampled every second. This is the typical situation in modern systems that easily log response times of individual requests, but cannot probe utilization with fine-grain or even per-request resolution. The demand estimation accuracy is compared for the traditional, CPU utilization-based approach (UR), and the methods in accordance with the present disclosure including response-time based regression (RR) and maximum likelihood (ML).

For each simulation, corresponding to a different choice of the number of classes K and of the utilization $\rho$, the estimation accuracy can be evaluated based on an error function provided by:

$$\Delta = \sum_{k=1}^{K} \frac{1}{K} \left| \frac{E[D_{EST,k}] - E[D_{EXACT,k}]}{E[D_{EXACT,k}]} \right| \quad (21)$$

which is the mean relative error over all classes of the estimated service demands $E[D_{EST,k}]$ with respect to the exact value $E[D_{EXACT,k}]$ used in the simulations. For each simulation, the $E[D_{EXACT,k}]$ value of each class is randomly drawn with uniform distribution ranging in [0, 1].

Figure 7B:
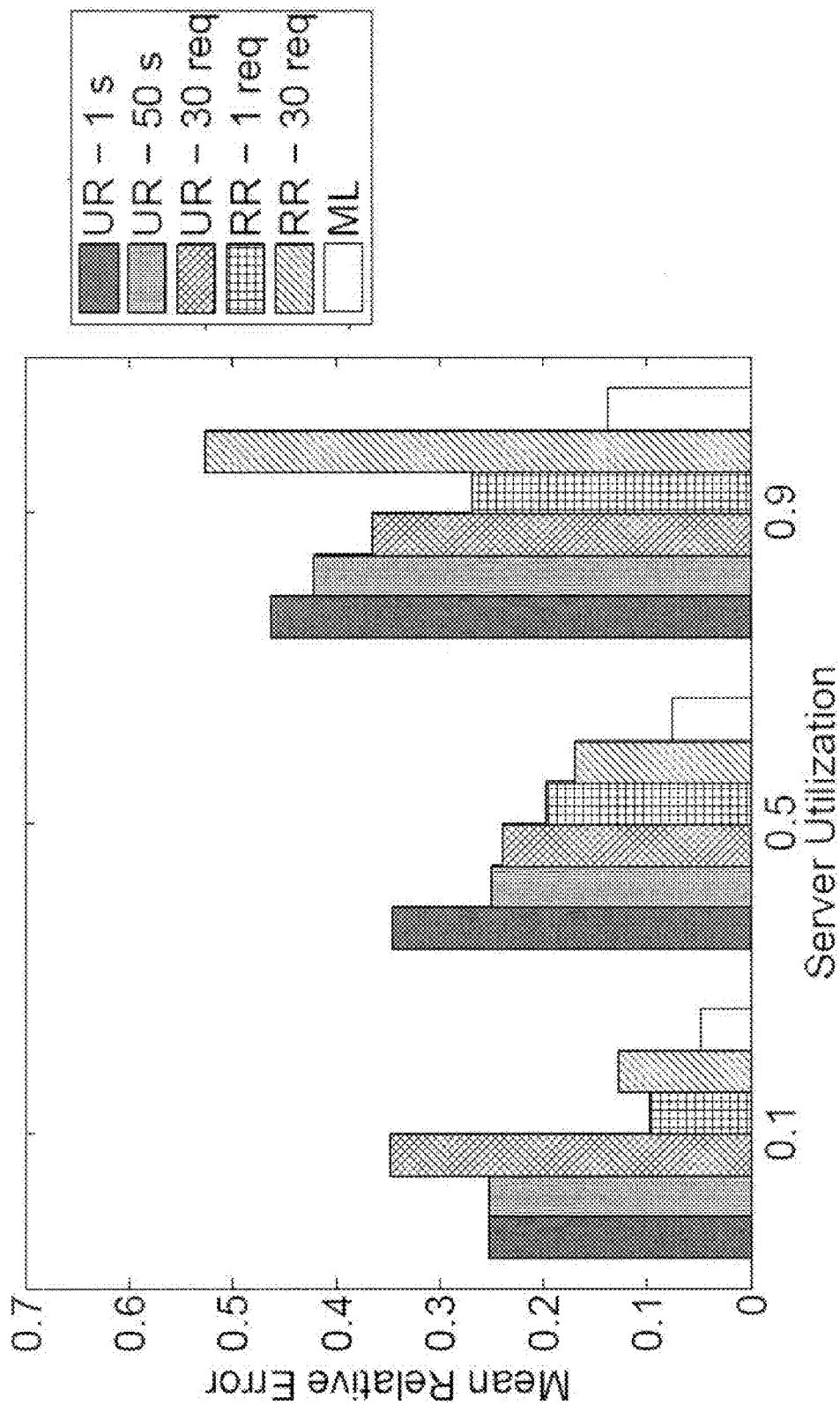
Figure 7C:
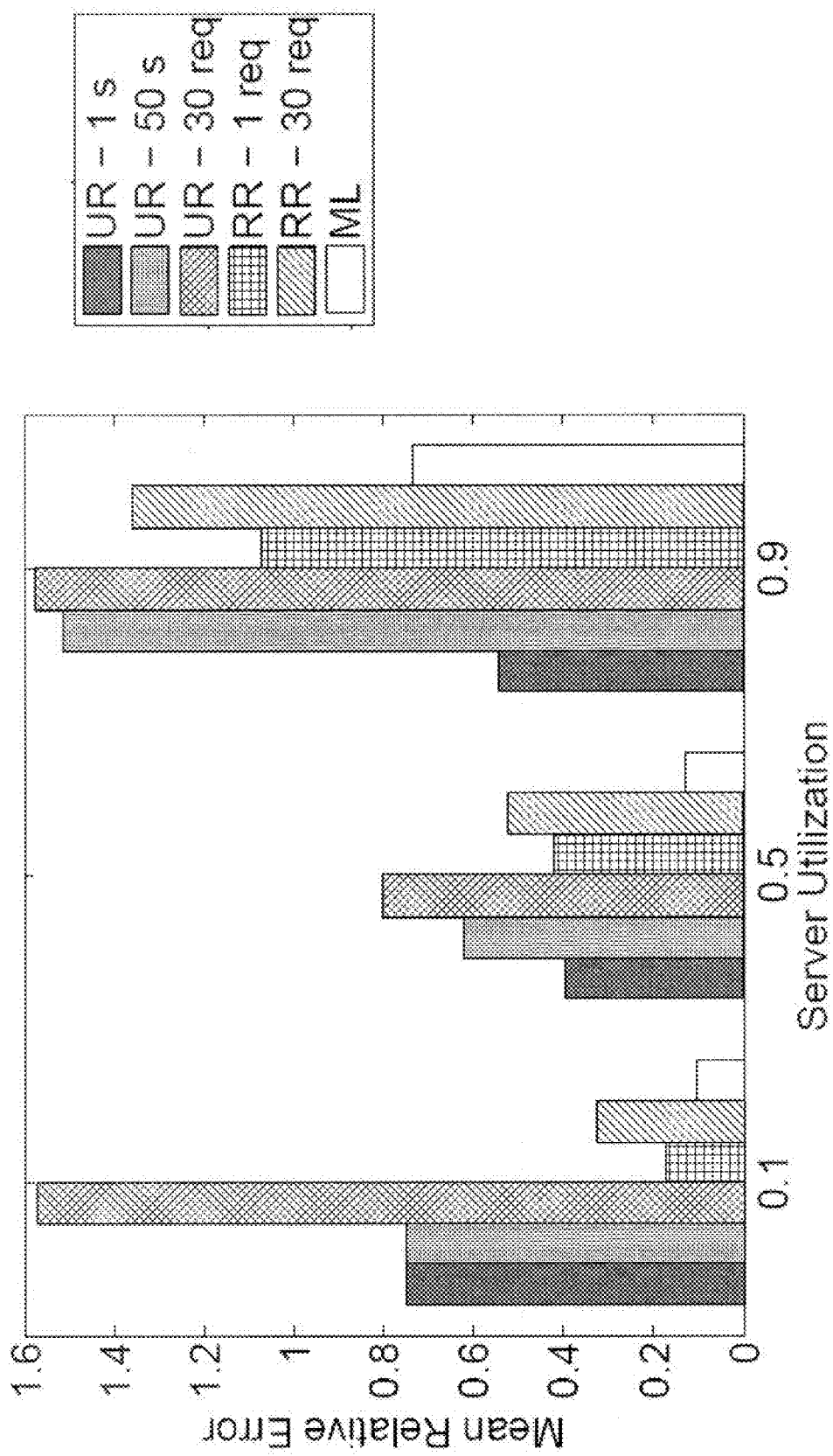

FIGS. 7A-7C include exemplar graphs illustrating the mean value $E[\Delta]$ determined by averaging $\Delta$ over 100 simulations with random service demands and having the same number of classes K and server utilization $\rho$. FIG. 7A is a graph corresponding to a single request class and illustrates the mean relative error values for server utilization levels of 0.1, 0.5 and 0.9. FIG. 7B is a graph corresponding to two request classes and illustrates the mean relative error values for server utilization levels of 0.1, 0.5 and 0.9, and FIG. 7C is a graph corresponding to five request classes and also illustrates the mean relative error values for server utilization levels of 0.1, 0.5 and 0.9. In FIGS. 7A-7C, UR-1$s$ indicates the mean relative error value for CPU utilization based regression on all available samples, UR-50$s$ indicates the mean relative error value for CPU utilization based regression averaging measurements over 50 consecutive examples, and UR-30 req indicates the mean relative error value for CPU utilization based regression using averages on partitions formed by 30 consecutive samples such that 30 requests fall into each partition. RR-1 req indicates the mean relative error value for response time based regression using all available samples, while RR-30 req uses averages over partitions of 30 requests of the same class. ML indicates the mean relative error value for response time based maximum likelihood using all available samples.

Figure 8A:
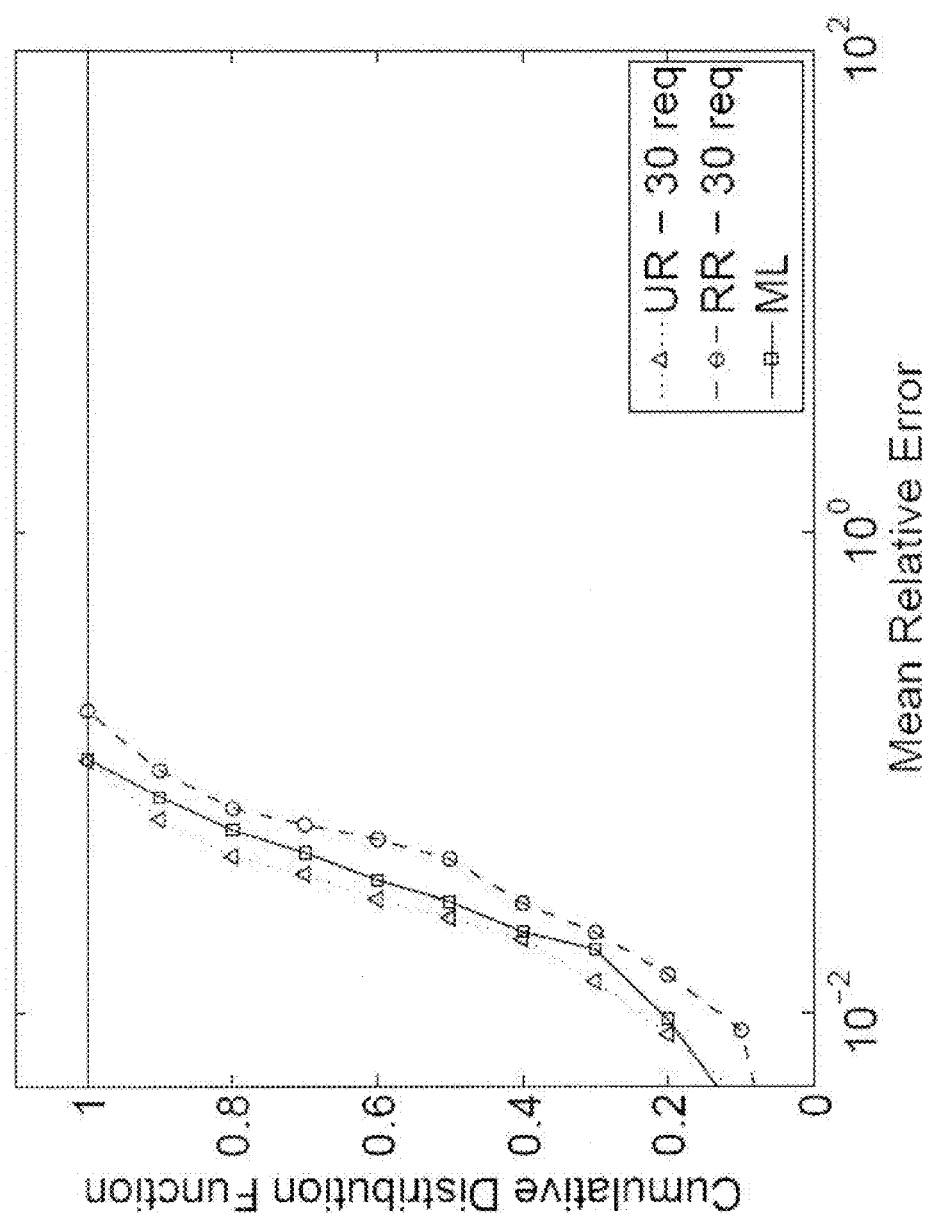
FIGS. 8A-8C illustrate exemplar cumulative distribution functions (CDFs) corresponding to the mean relative errors of FIGS. 7A-7C.
Figure 8B:
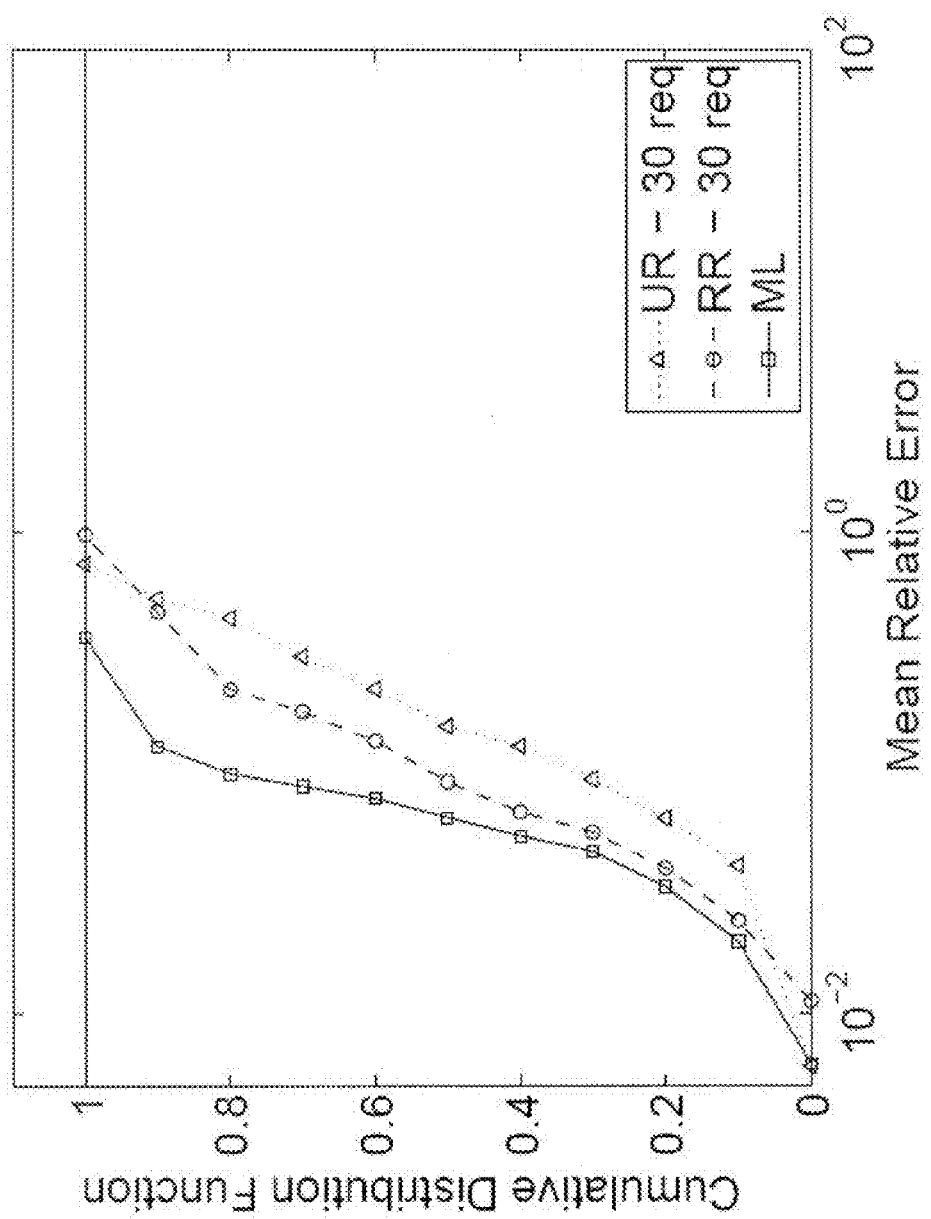
Figure 8C:
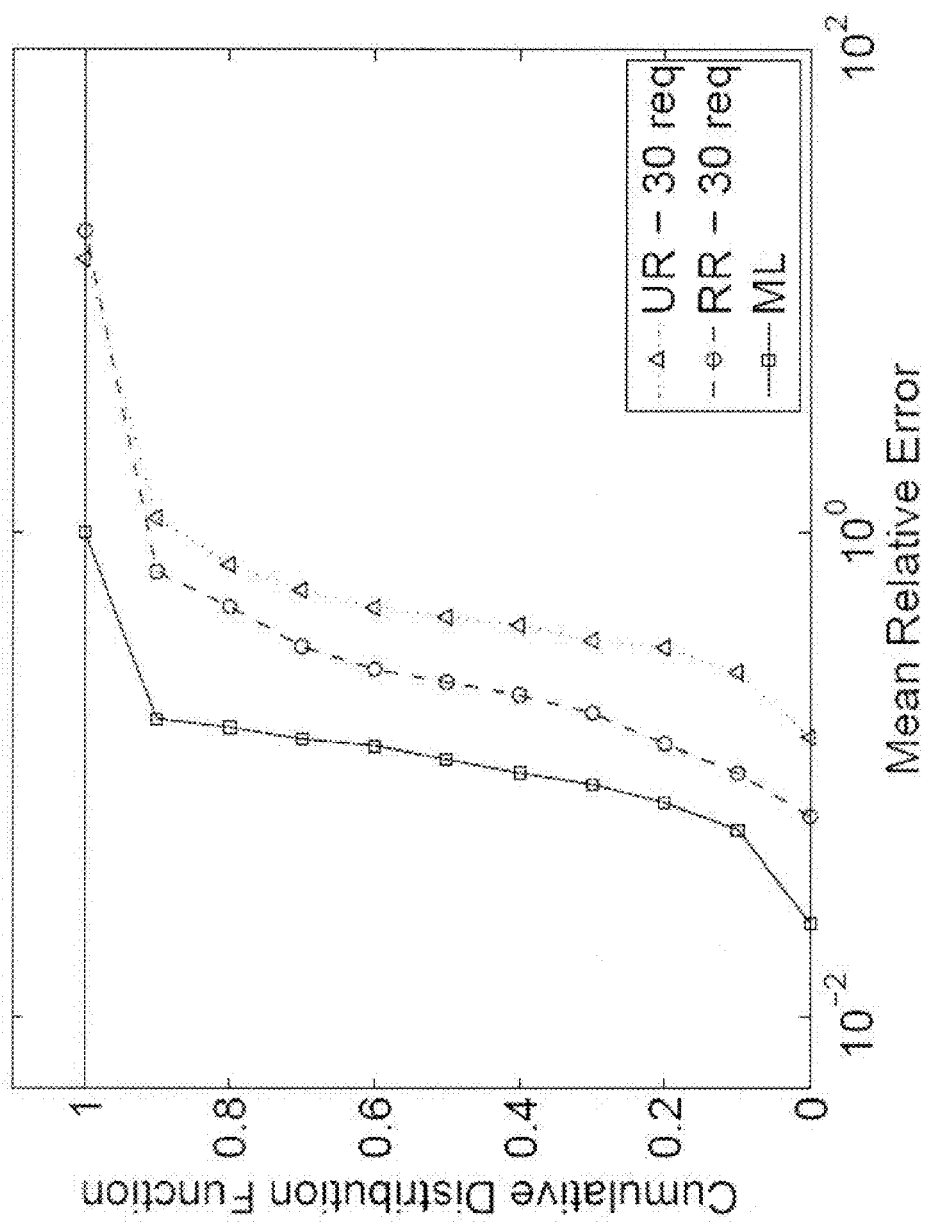

FIGS. 8A-8C include exemplar graphs that illustrate the cumulative distribution function (CDF) of $\Delta$ over 100 random models for $\rho = 0.5$ and K=1, 2, 5. FIGS. 8A-8C only include the CDF's for UR-30 req, RR-30 req and ML for ease of plotting, and because the curves not shown lead to qualitative conclusions in line with FIGS. 7A-7C.

The single-class scenario is the simplest scenario, because only a single mean service demand E[D] is estimated. Most methods perform well in this case showing an error around 5% for the different utilization levels (see FIG. 7A), Only UR-1 $s$ delivers a low quality result featuring error values of more than 30% even at medium load ($\rho = 0.5$). This effect can be explained in terms of an insufficient number of events in the sample period, which invalidates the linear regression formula, because the sample averages are computed on a subset of values that has too small of a cardinality (e.g., even 1, 2 or 3 requests). Consequently, the aggregations used in UR-30 req and UR-50 $s$ have a remarkably positive effect on removing the UR-1 $s$ errors, lowering $E[\Delta]$ to below 5% for UR-30 req. Furthermore, the RR methods provide high quality results for all utilization levels. ML also provides similar high-quality results for all utilization levels. The observations of FIG. 7A are confirmed by the error distribution. More specifically, FIG. 8A provides low probabilities of high errors for most of the methods, approximately with a 95th-percentile of 12% for all techniques. Accordingly, for the single class case, the techniques, except UR-1 $s$, provide accurate results.

When moving from single to multi-class workloads, the errors grow as illustrated in FIG. 7B. ML has the smallest errors when considering two request classes and provides errors of less than 8% in medium load situations ($\rho = 0.5$). The quality of the ML performance is highlighted in comparison to UR-1 $s$, where error values of almost 35% are seen for the same utilization level. An aggregation of utilization samples does not prove to be as effective as in the single-class scenario, and UR-30 req, as well as UR-50 $s$ are not very different from UR-1 req. RR-1 req provides better results than the UR methods. The distribution analysis presents similar results for $\rho = 0.5$. For example, in FIG. 8B, ML has a 95th-percentile of 17%, whereas RR-30 req and UR-30 req have 95th percentiles of 54% and 61% respectively.

FIG. 7C shows the fact that the quality of the results significantly changes when moving to a five class scenario.

More specifically, the general accuracy decreases (note that the vertical scale is different for all figures) and especially in high load. This is expected as a result of the larger number of service demands to be estimated. UR-1 s, UR-30 req, and UR-50 s have consistently large errors, with the best result among UR methods being achieved by UR-1 s in the ρ=0.5 case. Aggregation for UR again does not lead to accuracy increases. RR-1 req delivers similar results in medium utilization levels, while RR-30 req deteriorates the error value. The only method that delivers high-quality results, at least at low and medium utilization levels, is ML (less than 12% error). The heavy load case seems difficult for all methods. The CDF of the K=5 scenario in FIG. 8C emphasizes the quality of ML, which achieves producing 95% of errors below 21%. RR-30 req has a 95th-percentile of 111%, while for UR-30 req it is 162%. For UR-1 s (not shown in FIG. 7C) it is 56%. Consequently, ML is overall more robust.

The exemplar results provided in FIGS. 7A-7C and 8A-8C indicate that multi-class estimation within medium sized data sets, corresponding to sets of events in 600 seconds for different utilization values, is a challenging problem. ML robustly performs such estimations in almost all cases. The ML results are extremely good with limited information (e.g., low utilization). RR-1 req appears more effective than RR-30 req in all experiments, and is generally competitive with the UR methods at low and medium load.

Figure 9:
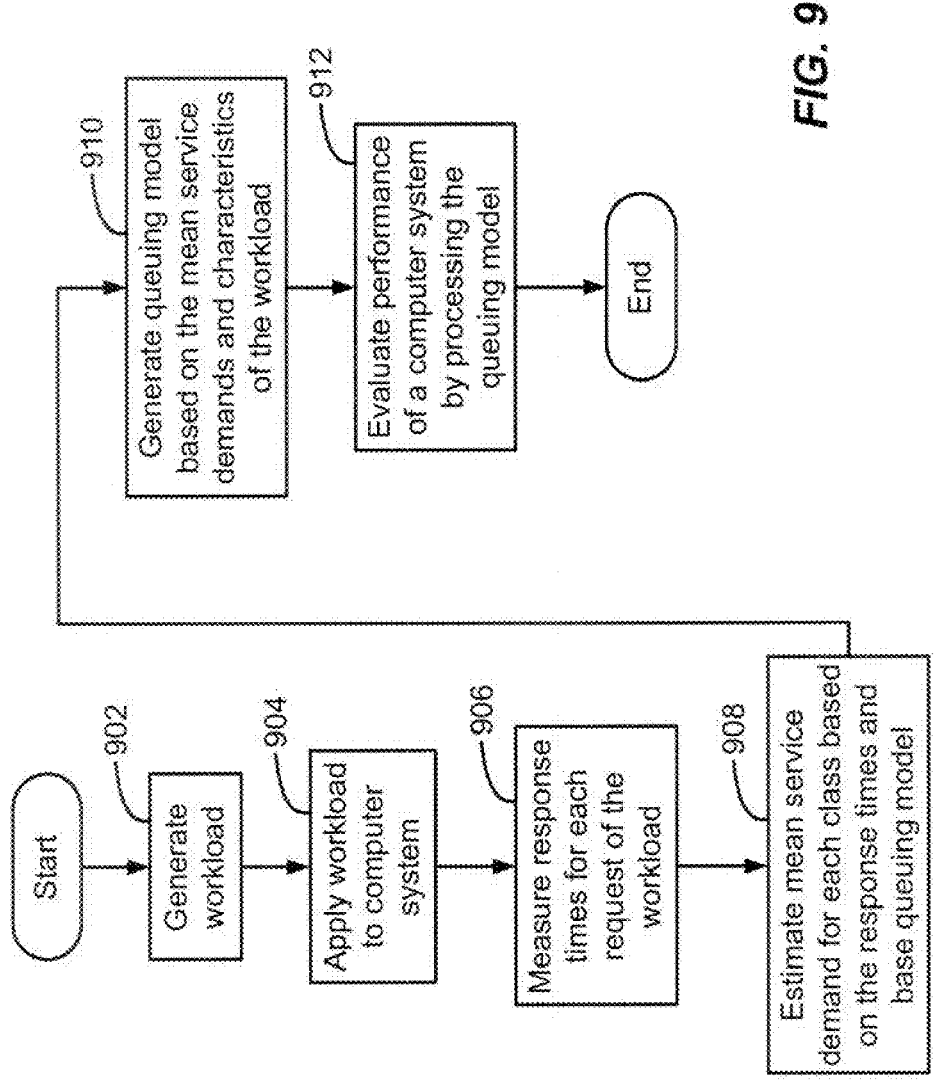
FIG. 9 is a flowchart illustrating exemplar steps that can be executed in accordance with implementations of the present disclosure.

Referring now to FIG. 9, a flowchart illustrates exemplar steps that can be executed in accordance with the present disclosure. In step 902, a workload is generated, the workload including a plurality of service requests including a plurality of classes that can be processed by a computer system. The computer system can include an application server that executes an application, and one or more client systems that generate the requests. The workload is applied to the computer system in step 904, and a response time is measured for each request of the workload in step 906. In step 908, a mean service demand is estimated for each class based on the response times and a base queuing model. The base queuing model can include assumptions on characteristics of a final queuing model, the characteristics comprising at least one of scheduling and a service demand distribution.

Estimating a mean service demand can include estimating mean service demands in the base queuing model using one of linear regression and maximum likelihood method analyses based on the measured response times. Estimating a mean service demand can be further based on a plurality of arrival queue-lengths, the plurality of arrival queue-lengths corresponding to each request of the workload. Each arrival queue-length of the plurality of arrival queue-lengths can be determined from log files that report a time of arrival and departure of requests. Estimating a mean service demand can be further based on a plurality of residual times. The plurality of residual times can correspond to each request of the workload. Each residual time can correspond to a time remaining to complete processing of an in-process request upon arrival of a to-be-processed request A queuing model is generated in step 910 based on the mean service demands and characteristics of the workload. Characteristics of the workload can include, but are not limited to, an inter-arrival time distribution of requests arriving into the queue such as exponential inter-arrival times having mean of 5 requests per second. Generating the queuing model can include parameterizing the base queuing model using the mean service demands. In step 912, a performance of a computer system is evaluated by processing the queuing model using a plurality of inputs.

Figure 10:
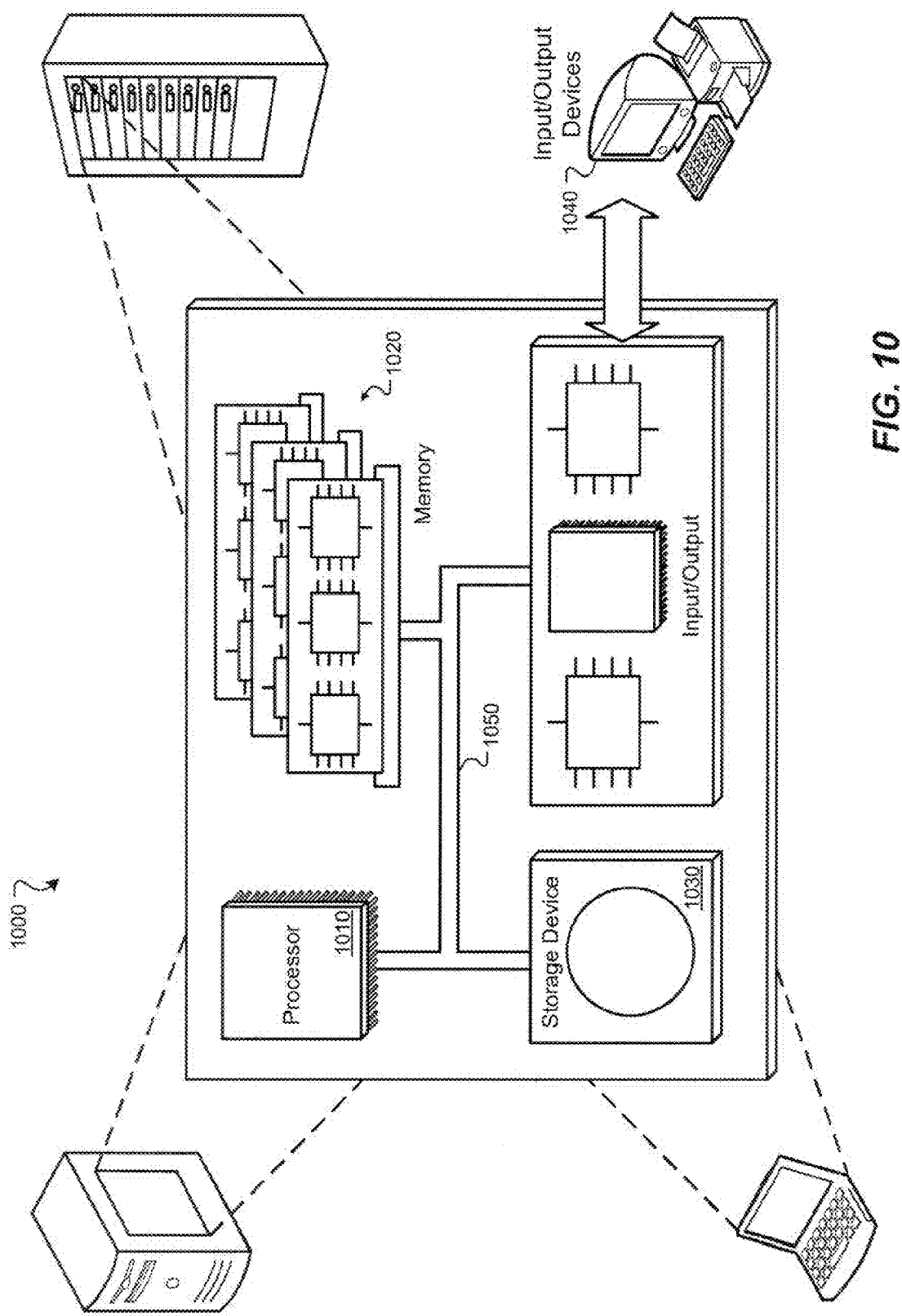
FIG. 10 is a schematic illustration of exemplar computer systems that can be used to execute implementations of the present disclosure.

Referring now to FIG. 10, a schematic illustration of exemplar hardware components 1000 that can be used to execute implementations of the present disclosure is provided. The system 1000 can be used for the operations described in association with the methods described herein. For example, the system 1000 may be included in the application server system 106. The system 1000 includes a processor 1010, a memory 1020, a storage device 1030, and an input/output device 1040. Each of the components 1010, 1020, 1030 and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of evaluating a performance of a computer system based on a queueing model, comprising:
    defining a workload comprising a plurality of service requests, each service request corresponding to a class of a plurality of classes;
    applying, by one or more processors, the workload to the computer system that receives and processes the plurality of service requests;
    measuring, by the one or more processors, a response time of the computer system for each request of the workload to provide a plurality of measured response times;
    determining, by the one or more processors, a mean response time for each class based on the plurality of measured response times;
    estimating, by the one or more processors, a mean service demand for each class based on the mean response time for a respective class and a base queueing model that represents the computer system to provide a plurality of mean service demands, each of the plurality of mean service demands defining an average time a respective service request is attended to by the computer system;
    generating, by the one or more processors, the queueing model based on the mean service demands and characteristics of the workload, the queueing model modeling queuing of the plurality of service requests submitted to the computer system; and
    processing the queueing model using a plurality of inputs to evaluate the performance of the computer system.

2. The method of claim 1, further comprising determining a plurality of arrival queue-lengths corresponding to each request of the workload, wherein estimating a mean service demand is further based on the plurality of arrival queue-lengths.

3. The method of claim 2, wherein each arrival queue-length of the plurality of arrival queue-lengths is determined from log files that report a time of arrival and departure of requests.

4. The method of claim 1, further comprising determining a plurality of residual times corresponding to each request of the workload, wherein estimating a mean service demand is further based on the plurality of residual times.

5. The method of claim 1, wherein estimating a mean service demand comprises estimating mean service demands in the base queueing model using one of linear regression and maximum likelihood method analyses based on the measured response times.

6. The method of claim 1, wherein generating the queueing model comprises parameterizing the base queueing model using the mean service demands.

7. A non-transitory computer-readable storage medium coupled to one or more processors and having instructions stored thereon which, when executed by the one or more processors, cause the one or more processors to perform operations for evaluating a performance of a computer system based on a queueing model, the operations comprising:
    defining a workload comprising a plurality of service requests, each service request corresponding to a class of a plurality of classes;
    applying the workload to a computer system that receives and processes the plurality of service requests;
    measuring a response time of the computer system for each request of the workload to provide a plurality of measured response times;
    determining a mean response time for each class based on the plurality of measured response times;
    estimating a mean service demand for each class based on the mean response time for a respective class and a base queueing model that represents the computer system to provide a plurality of mean service demands, each of the plurality of mean service demands defining an average time a respective service request is attended to by the computer system;
    generating a queueing model based on the mean service demands and characteristics of the workload, the queueing model modeling queuing of requests submitted to the computer system; and
    processing the queueing model using a plurality of inputs to evaluate the performance of the computer system.

8. The storage medium of claim 7, wherein the operations further comprise determining a plurality of arrival queue-lengths corresponding to each request of the workload, wherein estimating a mean service demand is further based on the plurality of arrival queue-lengths.

9. The storage medium of claim 8, wherein each arrival queue-length of the plurality of arrival queue-lengths is determined from log files that report a time of arrival and departure of requests.

10. The storage medium of claim 7, wherein the operations further comprise determining a plurality of residual times corresponding to each request of the workload, wherein estimating a mean service demand is further based on the plurality of residual times.

11. The storage medium of claim 7, wherein estimating a mean service demand comprises estimating mean service demands in the base queueing model using one of linear regression and maximum likelihood method analyses based on the measured response times.

12. The storage medium of claim 7, wherein generating the queueing model comprises parameterizing the base queueing model using the mean service demands.

13. The storage medium of claim 7, further comprising evaluating a performance of a computer system by processing the queueing model using a plurality of inputs.

14. A system comprising:
a computer system that receives and processes a plurality of service requests;
one or more processors; and
a computer-readable storage medium coupled to the one or more processors and having instructions stored thereon which, when executed by the one or more processors, cause the one or more processors to perform operations for evaluating a performance of a computer system based on a queueing model, the operations comprising:
defining a workload comprising the plurality of service requests, each service request corresponding to a class of a plurality of classes;
applying the workload to the computer system;
measuring a response time of the computer system for each request of the workload to provide a plurality of measured response times;
determining a mean response time for each class based on the plurality of measured response times;
estimating a mean service demand for each class based on the mean response time for a respective class and a base queueing model that represents the computer system to provide a plurality of mean service demands, each of the plurality of mean service demands defining an average time a respective service request is attended to by the computer system;
generating the queueing model based on the mean service demands and characteristics of the workload, a queueing model modeling queuing of the plurality of service requests submitted to the computer system; and
processing the queueing model using a plurality of inputs to evaluate the performance of the computer system.

15. The system of claim 14, wherein the operations further comprise determining a plurality of arrival queue-lengths corresponding to each request of the workload, wherein estimating a mean service demand is further based on the plurality of arrival queue-lengths.

16. The system of claim 15, wherein each arrival queue-length of the plurality of arrival queue-lengths is determined from log files that report a time of arrival and departure of requests.

17. The system of claim 14, wherein the operations further comprise determining a plurality of residual times corresponding to each request of the workload, wherein estimating a mean service demand is further based on the plurality of residual times.

18. The system of claim 14, wherein estimating a mean service demand comprises estimating mean service demands in the base queueing model using one of linear regression and maximum likelihood method analyses based on the measured response times.

19. The system of claim 14, wherein the computer system comprises an application server that executes an application, and one or more client systems that generate the requests.

20. The method of claim 1, further comprising parameterizing the queueing model based on processing the queueing model and measured response times corresponding to the plurality of service requests.

* * * * *